Nov. 13, 1962 M. S. ROSENBERGER ETAL 3,063,530
CLUTCH STRUCTURE
Original Filed Oct. 19, 1953 2 Sheets-Sheet 1

INVENTORS
MAURICE S. ROSENBERGER
FRANK J. WINCHELL
HAROLD W. SCHULTZ

THEIR ATTORNEY

Nov. 13, 1962 M. S. ROSENBERGER ETAL 3,063,530
CLUTCH STRUCTURE
Original Filed Oct. 19, 1953 2 Sheets-Sheet 2

INVENTORS
MAURICE S. ROSENBERGER
FRANK J. WINCHELL
HAROLD W. SCHULTZ

THEIR ATTORNEY

United States Patent Office

3,063,530
Patented Nov. 13, 1962

3,063,530
CLUTCH STRUCTURE
Maurice S. Rosenberger, Birmingham, and Frank J. Winchell, Franklin Village, Mich., and Harold W. Schultz, Dayton, Ohio, assignors to General Motors Corporation, Detroit, Mich., a corporation of Delaware
Original application Oct. 19, 1953, Ser. No. 386,976, now Patent No. 3,016,119, dated Jan. 9, 1962. Divided and this application July 13, 1961, Ser. No. 139,325
5 Claims. (Cl. 192—69)

This invention relates to clutches and is particularly concerned with clutches for use in automatic transmissions.

This application is a division of Serial No. 386,976 filed October 19, 1953, now Patent No. 3,016,119, granted January 9, 1962.

The main object of the invention is to provide a new combination of clutch plates of specific design for use in a clutch pack, which new combination yields new and improved results in the operation of the clutch within an automatic transmission.

A further object of the invention is to provide a new combination of clutch plates wherein, due to the disposition, composition and shape of the alternating plates, the clutch operation and life is greatly improved.

In carrying out the above object, it is a further object to provide a combination of clutch plates wherein alternate waved and flat plates are used wherein the waved plates are made of metal, such as steel, and are unfaced and wherein the flat plates are faced with suitable friction material for clutch operation.

Another object of the invention is to provide a new combination of clutch plates wherein the heat pattern of the assembly is predetermined so that the plates, which are subjected to the highest temperature, are the unfaced plates whereas the faced plates are maintained at a relatively lower and more uniform temperature.

Further objects and advantages of the present invention will be apparent from the following description, reference being had to the accompanying drawings, wherein preferred embodiments of the present invention are clearly shown.

For illustrative purposes in the description to follow, the waved unfaced steel plate will be termed "the driven plate" while the flat plate having the friction facings thereon will be termed "the drive or driving plate."

Figure 1:
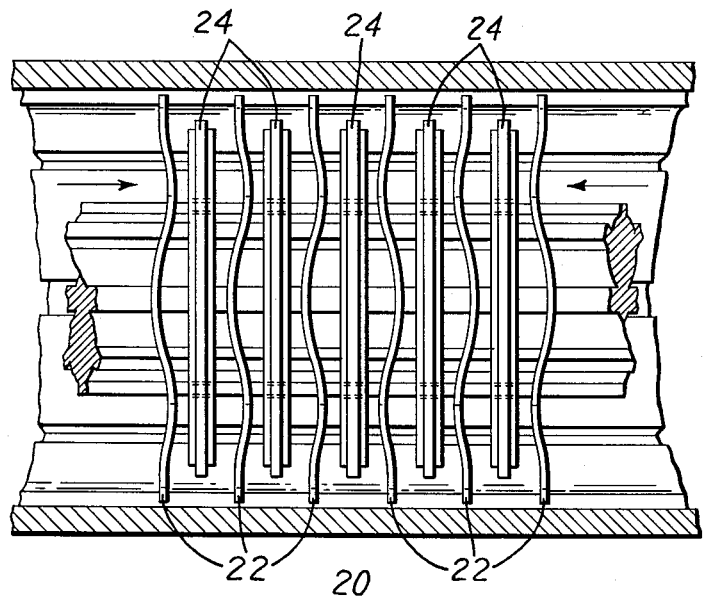
FIG. 1 is a diagrammatic showing of a clutch pack for use in automatic transmissions wherein waved and flat plates are alternately disposed about a central axis. The arrows indicate the direction of pressure application to cause the plates to engage in torque transmitting relation.
Figure 2:
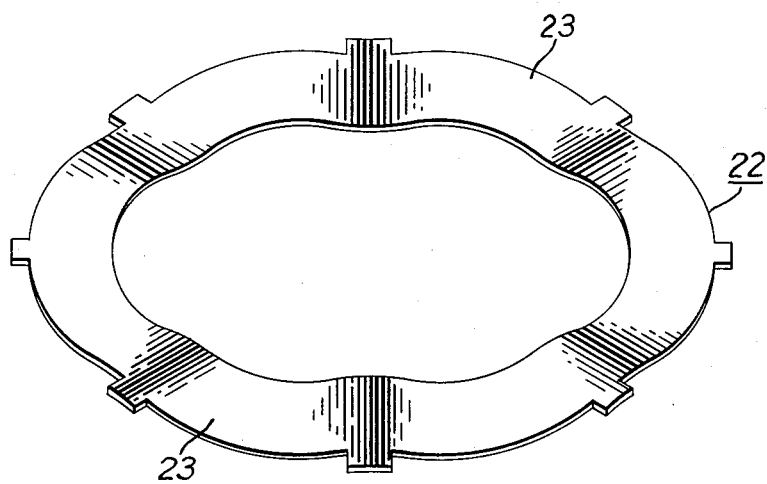
FIG. 2 is a view in perspective of one of the waved plates.
Figure 3:
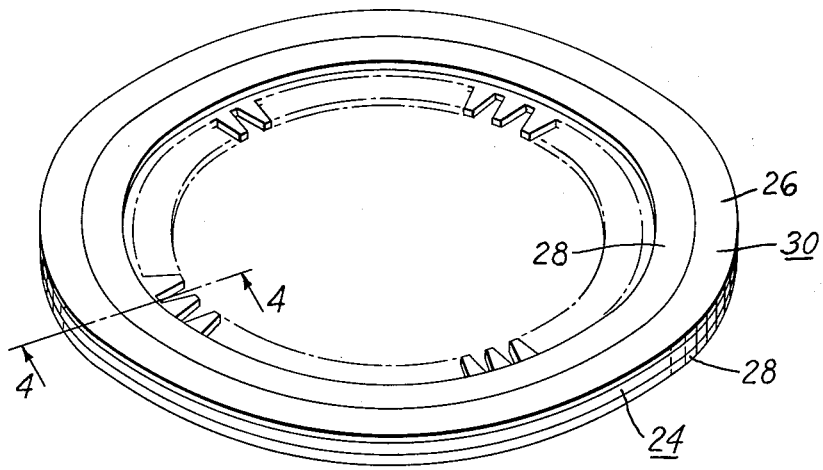
FIG. 3 is a view in perspective of one of the faced plates.
Figure 4:
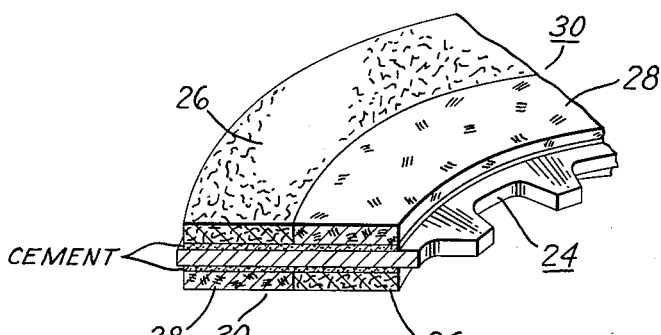
FIG. 4 is a section taken on line 4—4 of FIG. 3.

Clutch packs comprising a plurality of alternately disposed driving and driven plates are commonly used in all types of automatic transmissions. A diagrammatic view of one of the packs is shown at 20 in FIG. 1. These packs include driving and driven plates wherein one type of plate includes a facing thereon and wherein all the other plates of the other type are unfaced. In prior art embodiments, as noted in copending application, Serial No. 392,596, now Patent No. 2,733,797 issued February 7, 1956, the facing has been included on the drive plate which has been waved while the driven plate has usually been a flat or coned plain metal plate. This disposition of plates has been followed due to the operating characteristics of the pack within the automatic transmission. The waved or coned plates are used in this combination to provide a resilient cushion upon engagement of the pack and to provide smooth disengagement upon reverse operation or downshift, since it is apparent that either the waved or the coned plates have a degree of springiness which permits more gradual engagement and disengagement than could be expected through the use of flat plates which would have a tendency to grab upon engagement and stick in mating relation upon disengagement or removal of pack engaging pressure. The driven and driving plates are suitably splined to an outer drum and a central shaft respectively.

The present invention is directed to an entirely new combination of elements within a clutch pack 20 wherein a driven plate 22 is unfaced, and is preferably a resilient plate which is waved continuously in a serpentine and undulating manner around the periphery thereof as at 23 and wherein the number of waves may vary from 3 to 8 or more as the specific characteristics or combination may require. These waves are of small magnitude wherein the depth of each wave measured perpendicularly from a plane tangent to adjacent peaks to the lowest part of the intermediate valley is in the order of .005 to .030" for plates not exceeding 8" in diameter. The wave depth may increase proportionately with increasing plate diameters for specific desired characteristics. The wave is preferably of a converging nature.

The plate used in combination with this waved unfaced driven plate is a friction-surfaced, flat driving plate 24. A specific and very desirable combination of friction materials for this plate are concentric rings 26 and 28 of different materials, wherein ring 26 is made of a fibrous material which may include asbestos, cotton linters, cellulosic material, such as paper, etc, sheeted into plate-like form and bonded by a suitable binder, while the other ring 28 is made of cork, either in ground, bonded and sheeted form or in sheet form as it comes from nature. These concentric rings 26 and 28 of two materials upon the drive plate 24, are alternated at opposite sides of the plate so that the cork ring 26 is at the outer periphery of the plate on one side and the fibrous material ring 28 is at the outer periphery on the other side thereof. Thus, the concentric rings of sheeted fibrous material 26 and sheeted cork material 28 may be termed the friction facing 30.

This friction facing 30 is preferably bonded to the surface of the plate through the use of a heat resistant cement. One of such cements is disclosed in Patent No. 2,507,682, although any of the usual high temperature cements have been found to be satisfactory. In most cases, these cements include a base ingredient derived from a phenolic resin mixed with some suitable reinforcing material and in some cases, mixed with other polymerized material, such as butadiene-acrylonitrile, butadiene-styrene copolymers, etc., such cements being well known in the art.

The fibrous material and the cork within the facing rings 26 and 28 are bonded together with any suitable bonding agent. Here again phenolic resin bases are generally used alone or in combination with other resins, alcohols and/or compounding ingredients or the base may be modified with suitable modifying agents.

Instead of concentric rings 26 and 28 of different facing materials, the facing 30 may be of a single material of suitable nature, for example, the facing set forth in either of Patents Nos. 2,553,215 and 2,569,539. The friction facing does not necessarily have to be non-metallic or semi-metallic but may be a sintered metal facing either bonded or riveted to the backing member or the entire plate may be formed from sintered metal. It may either be flat or grooved at the engaging surfaces as desired.

In the present invention by utilizing the specific combination of unfaced waved plates 22 with faced flat plates 24, it is possible to obtain rather startling results in the transmission. Since the wave 23 is on the driven metal plate 22, said plate will absorb the heat developed upon engagement of the clutch pack 20 at the high points of the waves 23. This heat is quickly dissipated into the metal plate 22 through the high heat conductivity of the metal. At the same time only small areas of the metal are engaging the faced surface of the drive plate 24 so that the heat developed on the surface of the drive plate 24 is maintained at a minimum. This is as it should be since the friction facing 30 of drive plate 24 does not have a high coefficient of heat conductivity. Similarly, since the plates 22 and 24 are rotating relative to one another, the heat developed at the surface of the faced plate 24 is uniformly developed over the entire surface thereof so that no one portion of the plate becomes overheated. In this manner, the facing material 30 on the drive plate 24 is maintained at a relatively lower temperature than has heretofore been possible which condition lengthens the life of the facing tremendously since it is not subjected to charring or other deleterious effects of heat. In fact, tests have shown that the life of the faced plate may be doubled by using this new combination when using any given facing material.

After the slipping engagement of the plates 22 and 24 has occurred, the plates are either fully engaged or fully disengaged whereby the generation of heat ceases. The heat distribution is improved through the fluid vehicle used in the transmission in which the clutch pack 20 runs. This fluid vehicle has a tendency to maintain uniform temperature conditions within the plates, although it is apparent that the driven plate 22 will be heated to a higher temperature, particularly at the high spots of the waves 23, than will the drive plate 24. However, since the driven plate 22 is metal, the temperatures involved are not at all critical and in no way cause any deleterious effects in the metal plate.

In the torque converter type of transmission, it has been found that this specific combination of plates, namely, a flat faced drive plate 24 in combination with a waved plain metal driven plate 22, produces more satisfactory engagement and disengagement of the clutch while simultaneously providing smooth operation during these periods of function. This particular condition is very desirable in clutch packs. In the automatic shifting type of transmission, the same conditions can be arrived at by proper calibration of the mechanism while in this latter type of clutch, the heat conditions are greatly improved by the specific combination of the clutch plates. It will be noted that in the shifting type of transmission, there is more frequent slipping action in the clutch due to the gear shifting and therefore the heat conditions are usually more critical in this type of transmission than in the torque converter type. However, in both instances, the heat pattern of the clutch pack 20 may be predetermined so that no overheating of the faced plate 24 occurs which will cause charring or disintegration of the facing material or destruction of the bond between the facing and the backing plate.

It is to be understood that any suitable friction material 30 may be utilized without departing from the spirit of the invention which is basically directed to a specific combination of clutch plates wherein the waved plate 22 is unfaced metal and functions against a flat plate 24 having a friction facing 30 thereon for the purposes of transmitting torque from one plate to the other when said plates are in engagement. Thus, the description herein while directed to a waved unfaced driven plate 22 and a faced flat drive plate 24 is not to be construed as limiting in that any combination of drive and driven plates that will transmit torque may be used so long as the waved plate is of unfaced resilient metal while the flat plate includes a friction facing thereon.

While the embodiments of the present invention as herein disclosed, constitute preferred forms, it is to be understood that other forms might be adopted.

What is claimed is as follows:

1. For use in an automatic transmission, a wet clutch pack adapted to operate in a fluid vehicle comprising, a plurality of each of two types of plates alternately arranged in alternate torque transmitting relation to one another, one type of plates consisting of unfaced metal having a waved peripheral surface including at least three waves, the other type of plates consisting of a flat metal base having at least the engaging surfaces thereof made from porous metal having the desired friction properties.

2. The device claimed in claim 1 wherein the unfaced waved plates each has between 3 and 8 waves thereon wherein the ratio of the depth of said waves to the diameter of the plate does not exceed 1 to 267.

3. The device claimed in claim 1 wherein the flat faced plates are driving plates and the waved unfaced plates are driven thereby when said plates are in torque transmitting relation to one another.

4. The device claimed in claim 1 wherein the sintered metal friction facings bonded to the flat metal plates are annular facings.

5. The device claimed in claim 1 wherein the flat faced plates consist of annular metal rings each carrying annular friction facings at both sides thereof and wherein the waved plates consist of annular rings having between 3 and 8 waves therearound.

References Cited in the file of this patent

UNITED STATES PATENTS

| | | |
|---|---|---|
| 971,168 | Bowdle | Sept. 27, 1910 |
| 987,954 | Brush | Mar. 28, 1911 |
| 1,340,885 | Fuller | May 25, 1920 |
| 1,722,522 | Hahn | July 30, 1929 |
| 2,135,126 | Harwood | Nov. 1, 1938 |
| 2,540,965 | Schellinger | Feb. 6, 1951 |
| 2,690,248 | McDowall | Sept. 28, 1954 |
| 2,733,797 | Almen et al. | Feb. 7, 1956 |

FOREIGN PATENTS

| | | |
|---|---|---|
| 447,886 | Great Britain | May 27, 1936 |